May 28, 1935. F. F. GRAHAM, JR 2,003,144
BROACHING TOOL
Filed Oct. 27, 1933

INVENTOR.
Frank F. Graham, Jr.
BY Chapman Ferguson
ATTORNEY.

Patented May 28, 1935

2,003,144

UNITED STATES PATENT OFFICE 2,003,144

BROACHING TOOL

Frank F. Graham, Jr., Cardiff, Md.

Application October 27, 1933, Serial No. 695,493

2 Claims. (Cl. 255—62)

This invention relates to a new and improved broaching tool, and more particularly to pneumatically operated broaching tools, and is especially adapted for use in marble and stone cutting.

In cutting marble or rock, especially in quarries where the blocks are to be cut to certain dimensions, a series of holes are drilled in the marble or stone with the usual pneumatic drill, relatively close together and along the channel desired. When the desired number of holes have been drilled it is necessary to broach or break away the partition of the marble or rock between the holes to form a continuous channel. The broaching is accomplished by practically the same operation as the drilling, and by substituting the broaching tool for the drill bit.

The object of my present invention is to provide a broaching tool comprising a head and a removable cutting blade, or blades, whereby when a blade has become dull or worn it can be readily removed from the head and replaced by a new one or one that has been sharpened. Another object of my invention is to provide a broaching head and cutting blade through which air under pressure is passed while the broaching is to be accomplished, to blow the particles of marble or stone out of the holes and out of the path of the cutting blade.

The invention consists of the novel construction and arrangement of the parts and combination of parts hereinafter more fully set forth in the following specification and pointed out in the appended claims.

In the accompanying drawing,—

Figure 1:
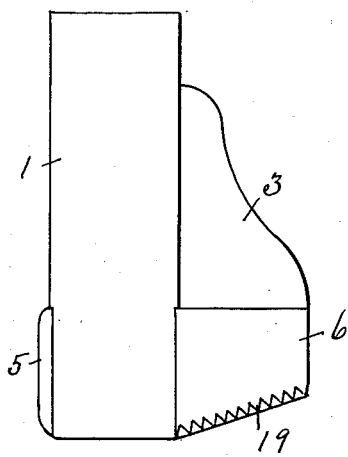
Figure 1 is a side elevation of my invention in which only one cutting blade is employed.
Figure 2:
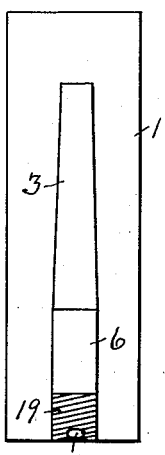
Figure 2 is an edge elevation of Figure 1.
Figure 3:
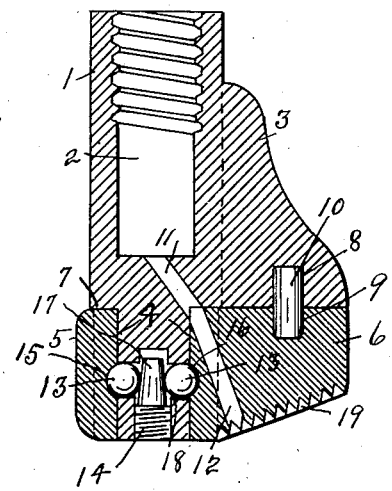
Figure 3 is a vertical longitudinal section of Figure 1.
Figure 4:
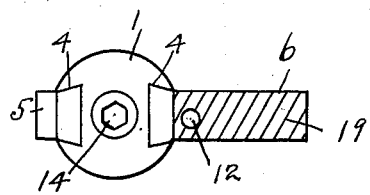
Figure 4 is an inverted plan view of Figure 1.
Figure 7:
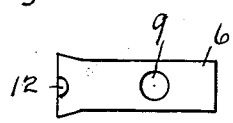
Figure 7 is a detail plan view of one of the cutting blades.

Referring to the accompanying drawing, forming part of this specification, and in which like reference numerals designate like parts throughout the several views, I designates the broaching head which has an opening 2 extending down from its upper end and is screw-threaded on its inner surface at 3 so that it can be attached to a hollow drill steel operated by a pneumatic drill. The body of the broaching head 1 is cylindrical in shape and has a wing 3 on one side thereof. Extending upwardly from the lower end of the head 1 are two dove-tailed slots 4 on opposite sides, in one of which is fitted the rubbing plate 5 which has a dove-tailed slide to fit the dove-tailed slot 4, and in the other slot 4 is placed the cutting blade 6 which also has one edge dove-tailed to fit the slot 4. The said rubbing plate 5 and cutting blade 6 are pushed into the slots 4 from the open end and the inner end of the plate 5 impinges against a shoulder 7 and the cutting blade 6 impinges against the lower end of the wing 3. The cutting blade 6 has a series of diagonally formed teeth 19 and the toothed surface of the cutting blade 6 inclines upwardly from the lower end of the broaching head 1. The wing 3 is provided with a hole 8 in its lower surface and the cutting blade 6 is provided with a hole 9 in its upper surface which registers with the hole 8 when the blade 6 is in position in the cutting head. A pin 10 fits into the holes 8 and 9 of the wing 3 and cutting blade 6, respectively, and serves to hold the cutting blade rigidly in position when the cutting is being accomplished. An air passage 11 extends from the lower end of the aperture 2 to the lower edge of the wing 3 and communicates with an air passage 12 extending through the cutting blade 6. The rubbing plate 5 and cutting blade 6 are held securely in the head 1 by the steel balls 13 which are forced outwardly by the tapered end of the screw 14 and into the recesses 15 and 16 in the said rubbing plate 5 and cutting blade 6, respectively. The said screw 14 is screwed into the lower end of the head 1 and has a tapered inner end 17 which forces the balls 13 apart and into the recesses as described. The said balls 13 rest in the recess 18 in the head 1.

The broaching head 1 is secured to the hollow drill steel used with pneumatic drills for quarry work and the end of the head is placed in one of the holes and the tool operated in the same manner as the drill. The rubbing plate 5 impinges against one side of the hole and the cutting blade 6 operates against the partition formed between the holes cutting the same away and as the cutting is accomplished air under pressure is forced through the head 1 and air passages 11 and 12 forcing the particles of stone or marble away from the cutting blade and out through the holes.

Figure 5:
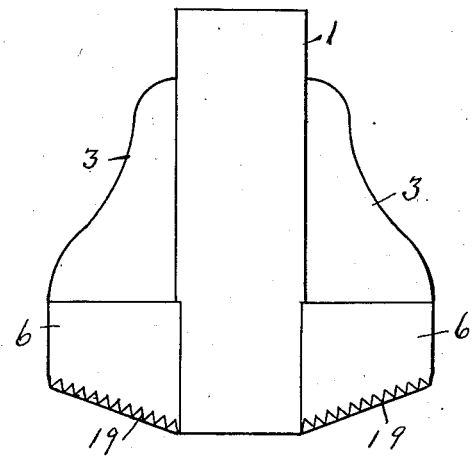
Figure 5 is a side elevation of my invention in which two cutting blades are employed.
Figure 6:
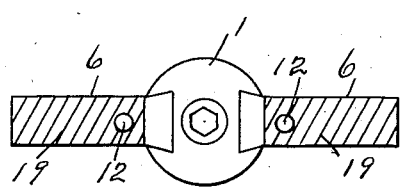
Figure 6 is an inverted plan view of Figure 5.

In Figures 5 and 6 I have shown the head 1 with two wings 3 and two cutting blades 6 on opposite sides in the use of which two of the partitions between the holes can be cut at the same time.

Having thus described my invention, what I claim is:

1. A broaching tool comprising a head having a wing projecting therefrom and an opening in one end having recesses on opposite sides thereof, a cutting blade removably secured to said head and impinging against the lower end of said wing and having a recess in one edge in line with one of the recesses in said head, a ball adapted to fit into the recess in said head and project into the recess in said cutting blade, and a screw in the end of said head adapted to force the ball into the recess in the cutting blade.

2. A broaching tool comprising a head having a wing projecting therefrom and an opening in one end having recesses on opposite sides thereof, a cutting blade removably secured to said head and impinging against the lower end of said wing and having a recess in one edge in line with the recess in said head, a rubbing plate removably secured to said head and having a recess in one edge in line with the recess in the said head, balls in the recess in said head and adapted to be forced into the recesses in the cutting tool and rubbing plate, and a tapered screw in the end of the said head adapted to force said balls apart and into the recesses in the said cutting blade and rubbing plate to hold them securely in position in the head.

FRANK F. GRAHAM, Jr.